United States Patent [19]
Verhagen

[11] 3,768,317
[45] Oct. 30, 1973

[54] ACCELERATION METER

[75] Inventor: Cornelis M. Verhagen, Heemstede, Netherlands

[73] Assignee: Datawell B. V., Haarlem, Netherlands

[22] Filed: Aug. 28, 1970

[21] Appl. No.: 67,956

[30] Foreign Application Priority Data
Aug. 28, 1969 Netherlands.................. 6913191

[52] U.S. Cl. .................................... 73/516, 338/44
[51] Int. Cl. ........................................ G01p 15/12
[58] Field of Search ................ 73/517 R, 517 B, 73/516 R, 70.2, 71.2; 338/44, 83, 80, 27, 38

[56] References Cited
UNITED STATES PATENTS

| 2,397,962 | 4/1946 | Hartz | 338/27 |
|---|---|---|---|
| 2,680,807 | 6/1954 | Hullegard | 73/517 R X |
| 2,974,531 | 3/1961 | Ackerman | 73/516 R |
| 3,096,497 | 7/1963 | Sellers | 338/83 |
| 2,665,896 | 1/1954 | Kirby et al. | 73/516 R |
| 3,321,699 | 5/1967 | Rademakers | 73/517 R X |
| 3,181,355 | 5/1965 | Dallas et al. | 338/44 X |

Primary Examiner—James J. Gill
Attorney—William J. Daniel

[57] ABSTRACT

The invention relates to an acceleration meter consisting of a vessel filled with electrically conducting liquid which vessel has a cylinder wall and two end walls perpendicular to said cylinder wall, which end surfaces form two fixed electrodes, a third electrode being resiliently mounted between the two fixed electrodes. According to a further elaboration of the invention it is possible to provide a small side-space communicating with the straight cylinder space, in which small side-space the third electrode is fixedly mounted and from which side-space the said electrode protrudes into the cylindrical space.

5 Claims, 2 Drawing Figures

PATENTED OCT 30 1973 3,768,317

ACCELERATION METER

The invention relates to an acceleration meter, provided with a vessel made of insulating material, which vessel is filled with an electrically conducting liquid (electrolyte) and is provided with two mutually parallel plane electrodes and a third electrode that is movable in a direction perpendicular to the planes of the first mentioned electrodes, and in which the electrodes are electrically coupled to each other by means of the electrically conducting liquid and each being provided with a terminal.

The invention aims at increasing the linearity of such an acceleration meter. If between both the fixed plane electrodes a predetermined voltage is applied and the voltage of the third electrode is detected and plotted as a function of the acceleration provoking deformation of the third electrode, the linearity of the meter should be interpreted as the linearity of this function.

It has been found, that this linearity can be obtained to a very high degree, if according to the invention the plane electrodes constitute the plane end walls of a straight cylindrical space filled with an electrolyte.

A straight cylindrical space is a space delimited by two end planes which are mutually parallel and the edges of which are connected by a curved or bent surface which in each point contains a straight line which is perpendicular to both said end planes.

Because with the invention the electrodes constitute the end walls of a straight cylinder space the electrical field in the conducting liquid is very homogeneous except in the immediate neighbourhood of the third electrode.

This homogeneous electrical current field is the base of the high linearity which can be obtained with the acceleration meter according to the invention.

In order to render the meter insensitive to accelerations in a transverse direction that is to say accelerations in a direction parallel to said plane electrodes, it is, according to a further elaboration of the invention, provided that the third electrode in the condition, in which no accelerations occur is parallel to the plane electrodes. By reason of this accelerations in the said transverse directions in first approximation will give no output signal.

A further increase of this linearity is obtained according to a further elaboration of the invention, in that the third electrode has been fixedly mounted at one end of it and is insulated from this fixed end over a considerable part of its length.

By reason of this the already in itself small non-linearity of the electrical field, which occurs if the third electrode is not positioned exactly midway between the two plane electrodes, is further decreased. An insulator gives rise to a smaller field disturbance than a conductor.

In order to be able to use a relatively long third electrode without using an extremely large vessel it is provided according to a further elaboration of the invention, that perpendicular to the cylinder wall of the liquid-filled space a space connected therewith is present, the area of the intersection of both these spaces being small in comparison with the cylindrical surface area of the straight cylinder space, in which case the third electrode is fixedly attached in the said further space at the end of this space opposite to the straight cylinder space. It has been shown that the disturbance of the electrical current field at the intersection of both surfaces, provided the intersectional surface area is small, effects the linearity very little, especially if the electrode at that location has been insulated.

With the acceleration meter according to the invention it is possible, as has been shown, to obtain a linearity of better than $1 : 10^{-4}$ for a measuring area from $-0.6$ g to $+0.6$ g (g being the earth acceleration). The acceleration meter according to the invention in principle is suitable for measuring considerable higher accelerations and this also with a very high linearity by chosing for the third electrode a more rigid spring.

The invention is further elucidated referring to the drawing, in which.

Figure 1:
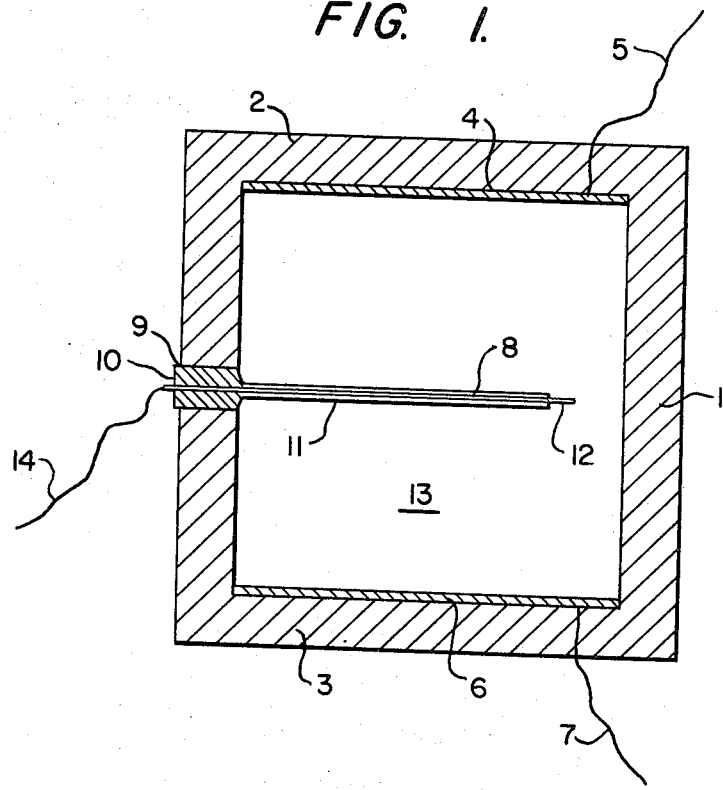
FIG. 1 shows a first embodiment of the invention.

In the drawing 1 indicates a straight cylinder wall having e.g., but not necessarily, a circle-shaped cross-section. This cylinder wall is terminated by an upper wall 2 and a bottom wall 3. At the lower side of the upper wall 2 an electrode 4 has been applied having a terminal 5. This electrode extends itself everywhere until the cylinder wall 1. In the same way the electrode 6, having a terminal 7 and extending itself everywhere until the cylinder wall 1 has been applied on the bottom wall 3. An elastical, e.g., plate-shaped third electrode 8 is at 9 fixedly attached to the cylinder wall 1. For this attachment a stop member 10 has been used. Further the electrode 9 is over a considerable part of its length, starting with the stop member 10, covered with an insulating material 11. Only the free portion 12 of the electrode 8 therefore contacts the liquid. This liquid 13 preferably is an electrolyte, e.g., water, in which a salt has been dissolved or which is slightly acidified. The voltage applied between the electrodes 5 and 7 preferably is an alternating voltage in order to oppose polarisation phenomena.

The working of the device is, that between the electrodes 5 and 7 a voltage is applied and that the voltage picked up by the end 12 of the electrode 8 is used as a measuring voltage. This voltage is dependent on the location of the part 12 of electrode 8 which location itself is dependent on accelerations which work on the electrode 8 in a direction perpendicular to the electrodes 5 and 6.

Figure 2:
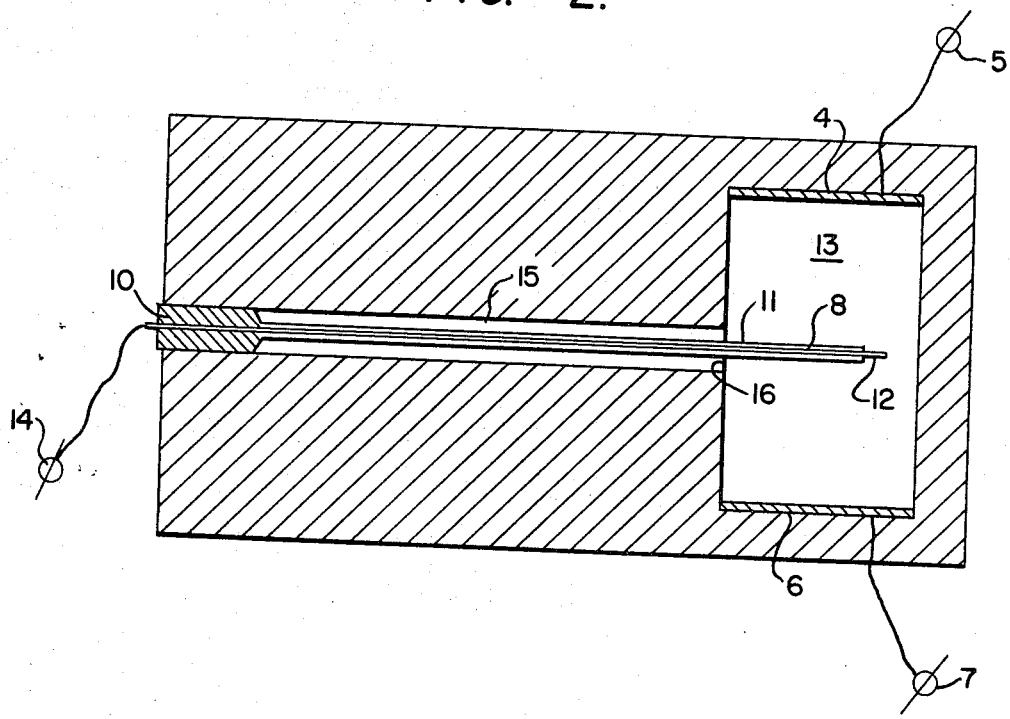
FIG. 2 shows a second embodiment.

In the embodiment of FIG. 2 the same references have been used as in that of FIG. 1 for indicating the same parts. In FIG. 2 a side-space 15 has been applied for obtaining a smaller liquid space, which side-space is connected with the straight cylinder space and orientated perpendicular in it. In the side-space 15 the electrode 8 is mounted having an insulation 11 by reason of which this electrode may have a considerable length. Though the electrical current field between the electrodes 5 and 7 is somewhat disturbed by the intersection 16 between the straight cylinder space and the side-space 15, it has been shown that the increase of the non-linearity originating herefrom is negligible, provided the intersection area of the space 15 with the straight cylinder space is sufficiently small and provided the dimensions of this intersection area are small in comparison with the distance of this intersection area to the electrodes 4 and 6 on the one hand and the uncovered part 12 of electrode 8 on the other hand.

I claim:

1. Acceleration meter comprising a housing defining a compartment of straight cylindrical configuration having its opposed end walls constituted by parallel planar electrodes of corresponding shape and its side walls of insulating material extending between the edges of said electrodes in perpendicular relation to the respective electrode planes, an electrically conducting liquid filling said compartment, a third electrode mounted within the compartment between said fixed electrodes for movement in a direction perpendicular thereto, said third electrode being of smaller area than said end electrodes, means for applying a voltage between the end electrodes and means for measuring the voltage at said movable electrode, said third electrode being an elongated flexible member fixedly attached at one of its end to said insulating side wall, said member having an insulating covering thereover except adjacent its free end.

2. Acceleration meter according to claim 1 in which the third electrode in its normal position lies within a plane which extends parallel to said end electrodes.

3. Acceleration meter according to claim 2, in which the third electrode is mounted midway between the end electrodes.

4. Acceleration meter according to claim 1 wherein said compartment side wall has a narrow elongated recess extending laterally from the main compartment interior at the locus of said electrode with the fixed end of said electrode attached at the base of said recess, remote from said main compartment interior.

5. Acceleration meter according to claim 4 wherein the dimension of said recess perpendicular to said electrode planes is small relative to the distance separating said electrode planes and relative to the distance from the recess opening to the exposed end of said electrode.

* * * * *